(12) United States Patent
Mandal et al.

(10) Patent No.: US 10,817,578 B2
(45) Date of Patent: Oct. 27, 2020

(54) METHOD AND SYSTEM FOR PROVIDING CONTEXT BASED ADAPTIVE RESPONSE TO USER INTERACTIONS

(71) Applicant: WIPRO LIMITED, Bangalore (IN)

(72) Inventors: Subhajit Mandal, Bangalore (IN); Sreekumar Choyarmadathil, Bangalore (IN); Manoj Madhusudhanan, Bangalore (IN)

(73) Assignee: Wipro Limited, Bangalore (IN)

( * ) Notice: Subject to any disclaimer, the term of this patent is extended or adjusted under 35 U.S.C. 154(b) by 355 days.

(21) Appl. No.: 15/718,038

(22) Filed: Sep. 28, 2017

(65) Prior Publication Data

US 2019/0057157 A1 Feb. 21, 2019

(30) Foreign Application Priority Data

Aug. 16, 2017 (IN) .............................. 201741029022

(51) Int. Cl.
| | | |
|---|---|---|
| *G06F 16/00* | (2019.01) | |
| *G06F 16/9535* | (2019.01) | |
| *G06F 16/9038* | (2019.01) | |
| *G06F 16/332* | (2019.01) | |

(52) U.S. Cl.
CPC ...... *G06F 16/9535* (2019.01); *G06F 16/3329* (2019.01); *G06F 16/9038* (2019.01)

(58) Field of Classification Search
CPC .... G06F 9/451; G06F 16/242; G06F 16/9038; G06F 16/9535; G06F 8/35
See application file for complete search history.

(56) References Cited

U.S. PATENT DOCUMENTS

| | | | |
|---|---|---|---|
| 9,369,410 B2 | 6/2016 | Capper et al. | |
| 2002/0152190 A1* | 10/2002 | Biebesheimer | G06F 16/9535 |
| 2008/0091406 A1* | 4/2008 | Baldwin | G10L 15/18 |
| | | | 704/4 |
| 2011/0125783 A1* | 5/2011 | Whale | G06F 16/93 |
| | | | 707/769 |

(Continued)

FOREIGN PATENT DOCUMENTS

CN 104008160 8/2014

*Primary Examiner* — Augustine K. Obisesan
(74) *Attorney, Agent, or Firm* — Finnegan, Henderson, Farabow, Garrett & Dunner, LLP

(57) ABSTRACT

Disclosed herein is method and system for providing context based adaptive response to user interactions. A primary context of the user interactions is determined based on intents and associated named entities extracted from the user interactions. Further, secondary context of the user interactions is determined by detecting enquiry intent in user responses for queries provided for the primary context of the user interactions. Information related to primary and the secondary contexts are stored as Key Context Information (KCI) and is dynamically updated during the user interactions. Finally, context based adaptive responses are generated based on the updated KCI upon determining non-enquiry intent in subsequent user responses. The method of present disclosure maintains track of the user interactions and automatically detects changes in the context of the user interactions. Thereafter, the method provides adaptive responses corresponding to each context of the user interactions, thereby improving overall user experience.

15 Claims, 7 Drawing Sheets

(56) References Cited

U.S. PATENT DOCUMENTS

| | | | |
|---|---|---|---|
| 2013/0160037 A1* | 6/2013 | Boyina | H04N 21/8541 725/14 |
| 2013/0307764 A1* | 11/2013 | Denker | G06F 16/332 345/156 |
| 2014/0337381 A1* | 11/2014 | Aravamudan | G06F 16/95 707/775 |
| 2015/0095159 A1* | 4/2015 | Kennewick | G06Q 30/0261 705/14.58 |
| 2016/0092160 A1* | 3/2016 | Graff | G01C 21/3641 704/257 |
| 2017/0337264 A1* | 11/2017 | Barbosa | G06F 8/38 |
| 2018/0176331 A1* | 6/2018 | Jain | H04L 67/18 |
| 2018/0329982 A1* | 11/2018 | Patel | G06F 17/27 |

* cited by examiner

METHOD AND SYSTEM FOR PROVIDING CONTEXT BASED ADAPTIVE RESPONSE TO USER INTERACTIONS

TECHNICAL FIELD

The present subject matter is related, in general to data analytics and more particularly, but not exclusively to a method and system for providing context based adaptive response to user interactions.

BACKGROUND

Presently, chatbots or automated response generation systems are becoming popular. Chatbots are designed to simulate conversation with users, especially to attend queries from the users across various business domains. However, one of the problems with the chatbots is that, they still behave like robots when the conversation deviates from a main topic of conversation. Often, the chatbots keep repeating a last question and/or a response that was previously provided to the user and get into an infinite loop whenever there is a change in the topic of conversation. Sometimes the chatbots may end the conversation abruptly after a few trials and repetitions of providing the automated responses.

The above limitations of the chatbots may affect quality of the conversation and overall user experience. Especially, when the chatbot is involved in a conversation related to an unknown topic, it is natural for the users to make enquiries related to technical domain of the topic. In such scenarios, if the chatbots keep repeating the same questions and/or the previously provided responses, then the user may get annoyed during the conversation, which in turn affects the overall user experience.

Ideally, the chatbots must be able to handle deviations in the topic of the conversation, and should be able to return to the main topic of the conversation after appropriately responding to enquiries related to topics other than the main topic of the conversation. Chatbots must be configured to track changes in context of the conversation, thereby by effectively responding to all the enquiries made by the human user and improving the overall user experience.

SUMMARY

Disclosed herein is a method for providing context based adaptive response to user interactions. The method comprises extracting, by a response generation system, one or more intents and one or more named entities associated with the one or more intents from the user interactions. Further, the method comprises determining a primary context of the user interactions based on the one or more intents and the one or more named entities. The information related to the primary context is recorded as Key Context Information (KCI). Upon determining the primary context, one or more queries for the primary context are provided to the user. Furthermore, the method comprises detecting an enquiry intent in one or more user responses for the one or more queries for determining a secondary context in the one or more user responses upon detecting the enquiry intent. Upon determining the secondary context, the method comprises detecting at least one of the enquiry intent or non-enquiry intent in one or more subsequent user responses received in response to one or more subsequent responses provided to the user. The one or more subsequent responses are generated in response to one or more queries for the secondary context. Finally, the method comprises generating one or more adaptive responses to the user interactions upon determining the non-enquiry intent in the one or more subsequent user responses based on the updated KCI.

Further, the present disclosure relates to a response generation system for providing context based adaptive response to user interactions. The response generation system comprises a processor and a memory. The memory is communicatively coupled to the processor and memory stores processor-executable instructions, which on execution cause the processor to extract one or more intents and one or more named entities associated with the one or more intents from the user interactions. Further, the instructions cause the processor to determine a primary context of the user interactions based on the one or more intents and the one or more named entities. Information related to the primary context is recorded as Key Context Information (KCI). Further, the processor provides one or more queries to the user for the primary context. Upon providing the one or more queries, the processor detects an enquiry intent in one or more user responses for the one or more queries and thereby determines a secondary context in the one or more user responses upon detecting the enquiry intent. Furthermore, the instructions cause the processor to detect at least one of the enquiry intent or non-enquiry intent in one or more subsequent user responses received in response to one or more subsequent responses provided to the user. The one or more subsequent responses are generated in response to one or more queries for the secondary context. Finally, the processor generates one or more adaptive responses to the user interactions based on the updated KCI upon determining the non-enquiry intent in the one or more subsequent user responses.

Furthermore, the present disclosure relates to a non-transitory computer readable medium including instructions stored thereon that when processed by at least one processor cause a response generation system to perform operations comprising extracting one or more intents and one or more named entities associated with the one or more intents from the user interactions. Further, the instructions cause the response generation system to determine a primary context of the user interactions based on the one or more intents and the one or more named entities. Information related to the primary context is recorded as Key Context Information (KCI). Upon determining the primary context, the instructions cause the response generation system to provide one or more queries to the user for the primary context. Further, an enquiry intent in one or more user responses for the one or more queries is determined. Upon determining the enquiry intent, the instructions further cause the response generation system to determine a secondary context in the one or more user responses. Once again, information related to the secondary context is updated in the KCI. Furthermore, the instructions cause the response generation system to detect at least one of the enquiry intent or non-enquiry intent in one or more subsequent user responses received in response to one or more subsequent responses provided to the user. The one or more subsequent responses are generated in response to one or more queries for the secondary context. Finally, the instructions cause the processor to generate one or more adaptive responses, based on the updated KCI, to the user interactions upon determining the non-enquiry intent in the one or more subsequent user responses.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
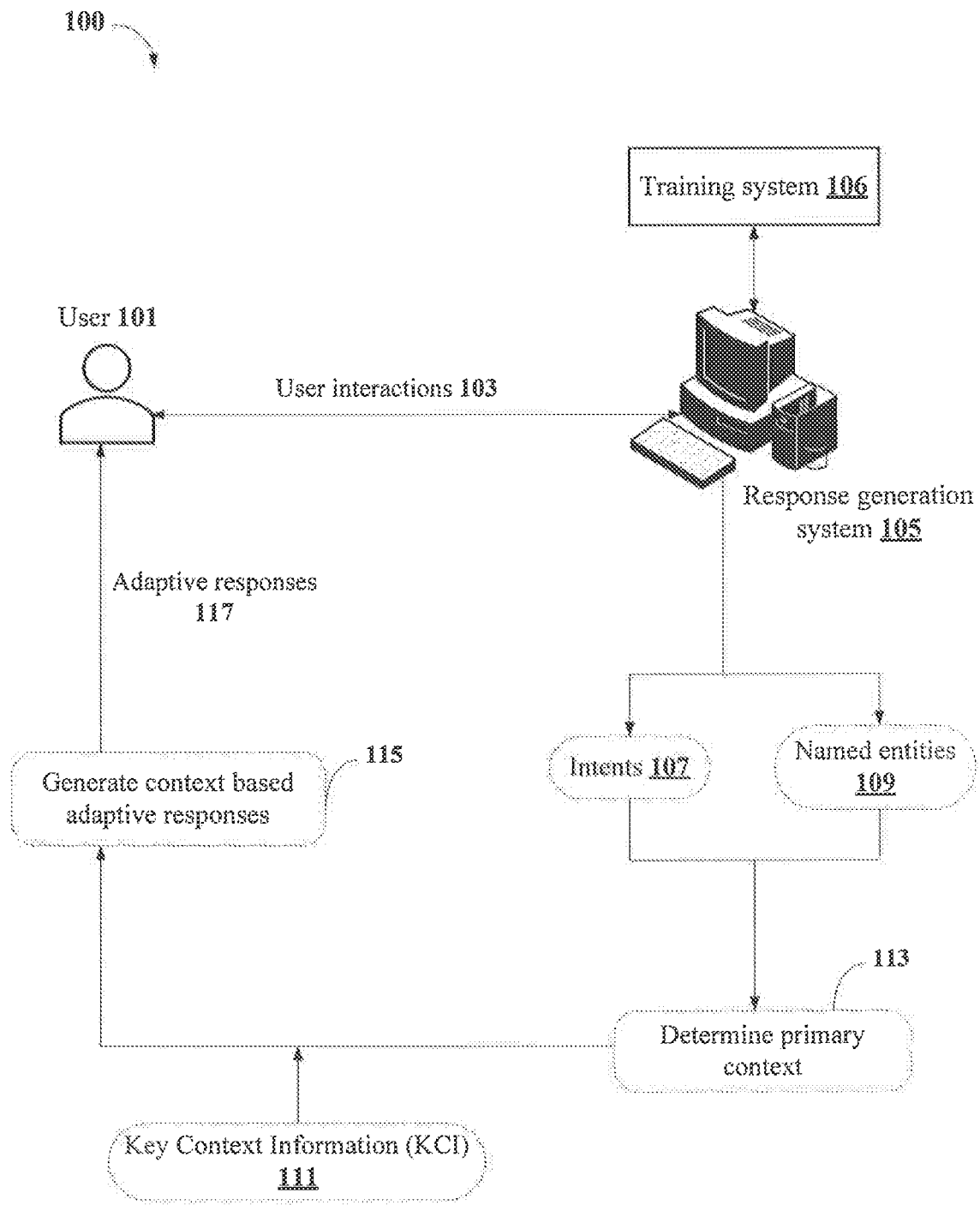
FIG. 1 illustrates an exemplary environment of providing context based adaptive response to user interactions in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a response generation system for providing context based adaptive response to user interactions. The method provides a mechanism for automated response generation systems and/or chatbots to track context of the conversation. The context of the conversation may be tracked by initially defining a context and then remembering sequence of each of the determined contexts in an ongoing conversation.

In an embodiment, the method of present disclosure organizes the conversation in a conversation tree, wherein each node in the conversation tree represents a context i.e. the point where a major thread of the conversation begins. Further, the method identifies an enquiry in the conversation and represents the enquiry as a separate node in the conversation tree for detecting a change in the context of the conversation.

In an embodiment, the response generation system may determine the sequence of contexts in the conversation by storing information related to the conversation in the form of an Application Programming Interface (API) based data structure called Key Context Information (KCI), and dynamically updating the information stored in the KCI as the conversation advances. Further, whenever the conversation hits a context node or an enquiry node as defined above, the context name and a last response provided to the user are collected and stored as a subsequent response in the KCI, thereby maintaining a history of the conversation.

Finally, the response generation system allows the user to switch between contexts of the conversation by recognizing an intent in the subsequent user responses and the updated KCI. The intent of the user response may be at least one of getting out of a topic or 'Quit' intent, getting back to the previous topic or 'Back to the topic', an 'Enquiry' intent and 'Confirm' or 'Deny' intents that automatically redirect the conversation into the previous context of the conversation.

Thus, the present disclosure discloses a method and a response generation system for providing context based adaptive response to user interactions. The response generation system is capable of automatically detecting a change in the context and/or topic of the conversation during the user interactions, and provides adaptive responses corresponding to the changes in the context of the conversation. In an embodiment, the method of present disclosure performs natural conversation with the user and helps in improving overall user experience by providing the context based adaptive responses. Also, the method improves the overall efficiency of the chatbots or automated response generation systems in handling natural conversations.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for providing context based adaptive response to user interactions 103 in accordance with some embodiments of the present disclosure.

The environment 100 includes a user 101, a response generation system 105, and a training system 106. The user 101 initiates user interactions 103 with the response generation system 105. The user interactions 103 are conversations between the user 101 and the response generation system 105 and may include, without limiting to, one or more user queries raised by the user 101, one or more queries generated by the response generation system 105 and provided to the user 101, one or more user responses for the one or more queries and one or more adaptive responses 117 provided to the user 101. In an embodiment, the user interactions 103 received by the user 101 may be in the form of verbal utterances, text inputs, audio inputs or video inputs.

In some embodiments, the response generation system 105 may be trained using a training system 106 associated with the response generation system 105 for configuring the response generation system 105 to handle one or more domain specific queries raised by the user 101. The training system 106 may be a supervised learning module that uses a combination of various machine learning models such as Support Vector Machine (SVM) learning technique, Artificial Neural Network (ANN) based learning techniques and the like for training the response generation system 105. In some embodiments, sample user interactions, in a sentence vector form, may be given as an input to the training system 106. Later, the training system 106 may parse each sentence vector to determine one or more intents 107 in the sample user interactions. Further, the training system 106 may classify each of the one or more intents 107 into one or more predetermined intent classes. Finally, the training system 106 may assign predetermined weights and/or priority scores to each of the intent classes and store results for future reference by the response generation system 105. In some implementations, the training system 106 may be set-up on a cloud storage and may be remotely accessed by the response generation system 105.

In some implementations, the training system 106 may include a sample conversation tree related to a specific training domain and one or more intents 107 and one or more named entities 109 associated with the one or more intents 107 that characterize each node in a conversation tree. The one or more intents 107 may represent an intent of the user 101 in the one or more user queries, which must be understood by the response generation system 105 for providing the context based automated response to the one or more user queries. As an example, the one or more intents 107 may be one of a 'Quit' intent, a 'Back_to_the_topic' intent, an 'Enquiry' intent, a 'Confirm' intent and a 'Deny' intent. Similarly, the one or more named entities 109 associated with the one or more intents 107 may represent a list of attributes associated with the one or more intents 107, such as numeric values, time frames, name of locations and the like that are included in the one or more user queries. The one or more named entities 109 assist the response generation system 105 to understand the one or more intents 107 in the one or more user queries and thereby helping the response generation system 105 to detect context of the one or more user queries.

In an embodiment, upon receiving the user interactions 103 from the user 101, the response generation system 105 may extract the one or more intents 107 and the associated one or more named entities 109 from the user interactions 103. Further, as shown in block 113, the response generation system 105 determines a primary context of the user interactions 103 based on the one or more intents 107 and the one or more named entities 109. In an embodiment, the primary context of the user interactions 103 may be represented as a primary node or a root node of the conversation tree. Further, the information related to the primary context such as, the one or more user queries, the one or more adaptive responses 117 provided in response to the one or more user queries and the like are stored in an Application Programming Interface (API) based data structure called Key Context Information (KCI) 111. The KCI 111 may be sequentially updated with information related to one or more contexts of the conversation until the user interaction 103 is concluded. In an embodiment, the KCI may be stored in the form of an index table.

In an embodiment, the response generation system 105 may determine a change in the context of the user interactions 103 whenever an enquiry intent is detected in the one or more user responses received by the user 101 in response to one or more queries provided to the user 101. The one or more queries provided to the user 101 may be related to the primary context of the user interactions 103. Further, upon determining the secondary context of the user interactions 103, the response generation system 105 may provide one or more subsequent responses related to the secondary context to the user 101. Finally, as shown in block 115, the response generation system 105 may generate the one or more adaptive responses 117 when a non-enquiry intent is detected in one or more subsequent user responses received in response to the one or more subsequent responses provided to the user 101.

In an embodiment, when there are multiple contexts in the user interactions 103, the response generation system 105 initially provides one or more adaptive responses 117 related to each of the one or more secondary contexts of the user interactions 103, before providing the one or more adaptive responses 117 related to the primary context of the user interactions 103. Alternatively, when there are no secondary contexts in the user interactions 103, the response generation system 105 may directly provide the one or more adaptive responses 117 related to the primary context of the user interactions 103.

Figure 2:
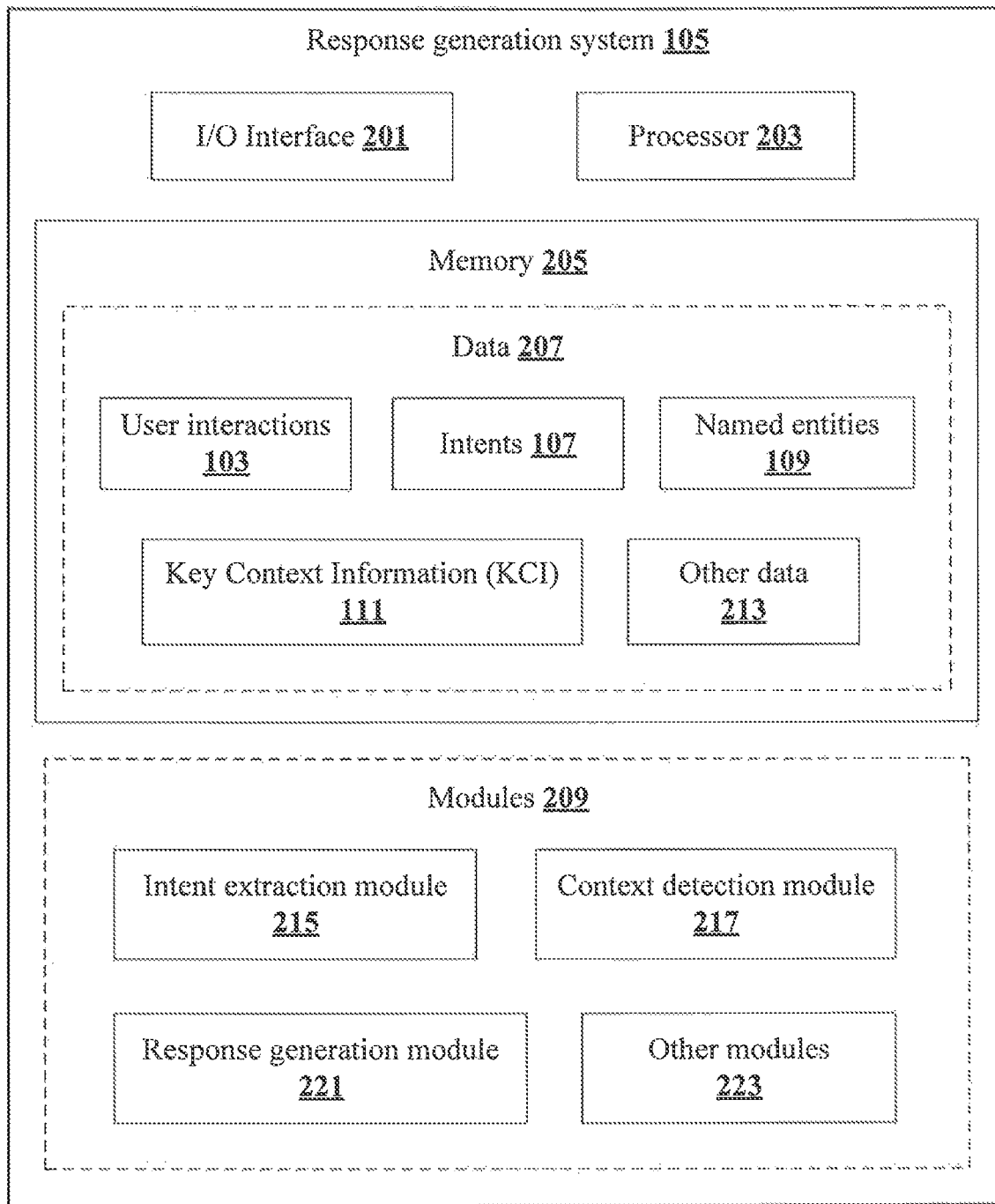
FIG. 2 shows a detailed block diagram illustrating a response generation system for providing context based adaptive response to user interactions in accordance with some embodiments of the present disclosure.

FIG. 2 shows a detailed block diagram illustrating a response generation system 105 for providing context based adaptive response to user interactions 103 in accordance with some embodiments of the present disclosure.

The response generation system 105 may include an I/O interface 201, a processor 203, and a memory 205. The I/O interface 201 may be configured to interact with the user 101 to perform the user interactions 103. The memory 205 may be communicatively coupled to the processor 203. The processor 203 may be configured to perform one or more functions of the response generation system 105 for providing the context based adaptive responses 117 to the user interactions 103.

In some implementations, the response generation system 105 may include data 207 and modules 209 for performing various operations in accordance with the embodiments of the present disclosure. In an embodiment, the data 207 may be stored within the memory 205 and may include, without limiting to, the user interactions 103, one or more intents 107, one or more named entities 109, Key Context Information (KCI) 111, and other data 213.

In some embodiments, the data 207 may be stored within the memory 205 in the form of various data structures. Additionally, the data 207 may be organized using data models, such as relational or hierarchical data models. The other data 213 may store data, including temporary data and temporary files, generated by the modules 209 for performing the various functions of the response generation system 105.

In an embodiment, the user interactions 103 is a part of conversation between the user 101 and the response generation system 105. As an example, the user interactions 103 may include, without limiting to, one or more user queries, one or more responses for the one or more user queries provided by the response generation system 105, one or more subsequent user queries and/or subsequent user responses received from the user 101 and one or more adaptive responses 117 provided to the user 101 in response to each query of the user 101. Thus, the term user interactions 103 may be used to collectively represent the sequence of queries and responses exchanged between the user 101 and the response generation system 105. In some implementations, the one or more user queries and/or the user responses may be received as a natural language string, which are subsequently parsed by the response generation system 105 to extract one or more intents 107 and one or more named entities 109 associated with the one or more intents 107.

In an embodiment, the one or more intents 107 may represent an objective of the one or more user queries and/or user responses received from the user 101. As an example, each of the one or more intents 107 detected in the one or more user interactions 103 may be classified into five intent classes as explained herein below:

i. 'Affirmative' or 'Confirm' Intent:

The Affirmative intent may be detected in the user interactions 103 when the user 101 responds positively to a query provided to the user 101. As an example, the positive response from the user 101 may be identified when the user response includes keywords such as 'Yeah', 'Okay', 'Yes', 'Fine', and the like. The Affirmative intent indicates that the user 101 is satisfied with the one or more adaptive responses 117 provided by the response generation system 105. In an embodiment, upon detecting the 'Affirmative' intent, the response generation system 105 may understand that the user 101 is satisfied with the previously provided response and hence terminates the current context of the user interactions 103. Suppose, if there is only a primary context in the user interactions 103, then the entire conversation may be terminated.

ii. 'Denial' or 'Negative' Intent:

The Denial intent may be detected when the user 101 responds negatively to a query provided to the user 101. As an example, the negative intent may be identified when the user response includes keywords such as 'No', 'Not now', 'Never', and the like. The Denial intent indicates that the user 101 is not satisfied and/or has not understood the one or more adaptive responses 117 provided by the response generation system 105. In an embodiment, upon detecting the 'Denial' intent, the response generation system 105 may re-phrase the one or more adaptive responses 117, previously provided to the user 101, and provide them to the user 101 to verify if the user 101 is satisfied with modified responses.

iii. 'Quit' Intent:

The Quit intent indicates that the user 101 wishes to terminate the entire conversation or wants to quit interactions related to a specific context of the conversation. As an example, the Quit intent may be detected when the user response includes keywords such as 'Bye', 'Terminate', 'Exit', 'Do not continue' and the like. In an embodiment, upon detecting the 'Quit' intent, the response generation system 105 may terminate the entire conversation and/or the specific context mentioned by the user 101.

iv. 'Back to the Topic' Intent:

The 'Back_to_the_topic' intent indicates that the user 101 wishes to interact about a previous context of the conversation. As an example, the 'Back_to_the_topic' intent may be detected when the user response includes key phrases such as 'Get back to the main topic', 'Switch to previous context' and the like. In an embodiment, upon detecting the 'Back_to the_topic' intent, the response generation system 105 may terminate a present context of the user interactions 103 and provide the one or more adaptive responses 117 corresponding to the previous context of the user interactions 103 using the updated KCI 111.

v. 'Enquiry' Intent:

The 'Enquiry' intent indicates that the user 101 needs further clarification regarding a previous response provided to the user 101. As an example, the 'Enquiry' intent may be detected when the user response includes key words such as 'How', 'What', 'When', 'Elaborate', 'Explain' and the like. In an embodiment, upon detecting the 'Enquiry' intent, the response generation system 105 may switch the context of the user interactions 103 to another context related to the enquiry made by the user 101. Further, the response generation system 105 may provide the one or more adaptive responses 117 to the context of the enquiry, until no further enquiries are made by the user 101.

In some embodiments, the five intent classes explained above may be broadly categorized as an 'Enquiry' intent class and a 'Non-enquiry' intent class. Thus, the 'Affirmative' intent, the 'Denial' event, the 'Quit' intent, and the 'Back_to the topic' intent may be combined under 'Non-enquiry' intent class, since none of these intent classes include a user enquiry. Further, it shall be noted that, the response generation system 105 may switch the context of the user interactions 103 only when the 'Enquiry' intent is detected in the user interactions 103. Alternatively, when the 'Non-enquiry' intent is detected, the response generation system 105 may either terminate the user interactions 103, move to the previous topic of the conversation, or provide the one or more subsequent responses to the user 101, without resulting in switching of the context of the user interactions 103.

In an embodiment, the one or more named entities 109 are associated with the one or more intents 107 of the user interactions 103. The one or more named entities 109 may include various entities such as, parameter values, and names of locations, persons, objects, and the like. For example, consider a user query—'What is the temperature in Location A?'. Here, the word 'What' indicates that the user query has an 'Enquiry' intent. Further, the words 'temperature' and 'Location A' are the named entities 109 that relate to and provide additional clarity to the intent of the user query. In an embodiment, the one or more intents 107 and one or more named entities 109 are used to determine the context of the user interactions 103.

In an embodiment, the KCI 111 may store sequence of user interactions 103 between the user 101 and the response generation system 105. For example, the KCI 111 may be stored in an API based data structure, that allows exchange of information via API calls. For example, the KCI 111 of a previously provided response may be passed along with the API call in a predetermined format, for example JSON format and the KCI 111 of the current response may be received along with the API call in the JSON format. As an example, the KCI 111 may include following information with respect to the user interactions 103 and the corresponding representation of the conversation tree:

a. Identifier (ID) of a current conversation node
b. ID of the previous conversation node
c. Response generated at the previous conversation node
d. Last node history: indicates IDs of all previous conversation nodes traversed during the user interactions 103. The last node history is maintained as a list and is dynamically appended with ID of a new conversation node whenever the context switch occurs.
e. Last response history: indicates all previous responses provided by the response generation system 105. The last response history is dynamically updated upon generating and providing a new response to the user 101.
f. Context node history: indicates list of all the context nodes visited until the current node has been reached.
g. Previously visited context node from the list of context node history.
h. An enquiry flag, indicates whether the response is originated from the enquiry node and/or enquiry intent in the user interactions 103.

In an embodiment, the KCI 111 may be represented as a 'Null' vector at the start of the user interactions 103 and as the user interactions 103 progress, the KCI 111 is dynamically updated with the above listed information, until the user interactions 103 are completed.

In an embodiment, the data 207 may be processed by one or more modules 209 of the response generation system 105. In one implementation, the one or more modules 209 may be stored as a part of the processor 203. In another implementation, the one or more modules 209 may be communicatively coupled to the processor 203 for performing one or more functions of the response generation system 105. The modules 209 may include, without limiting to, an intent extraction module 215, a context detection module 217, a response generation module 221 and other modules 223.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 223 may be used to perform various miscellaneous functionalities of the response generation system 105. It will be appreciated that such modules 209 may be represented as a single module or a combination of different modules.

In an embodiment, the intent extraction module 215 may be responsible for extracting the one or more intents 107 and the one or more named entities 109 associated with the one or more intents 107 from the user interactions 103. The intent extraction module 215 may refer to a domain specific knowledge base stored in the training system 106 for deducing the one or more intents 107 from the user interactions 103 based on predetermined weights and/or priority scores assigned to each of the intent classes. Further, the one or more named entities 109 may be extracted by identifying a match between the user interactions 103 and a list of predetermined named entities 109 and their synonyms. For example, if the user interaction is a user query such as— 'What is the temperature in Bangalore', then the named entity—'Bangalore' may be identified and extracted from the above user query by matching each word of the user query with a corresponding list of predetermined named entities 109 and their synonyms. Here, the synonyms that match with the named entity—'Bangalore' may include 'Bangalore' and 'Bengaluru'.

In an embodiment, the context detection module 217 may be responsible for determining the context of the user interactions 103. Upon initiation of the user interactions 103, the context detection module 217 may determine a primary context of the user interactions 103 based on the one or more intents 107 and the one or more named entities 109. As the conversation advances and when an enquiry intent is detected in the subsequent user responses, the context detection module 217 may determine one or more secondary contexts in the user interactions 103. The one or more secondary contexts in the user interactions 103 may be determined based on the updated KCI 111 and verifying the conversation tree to check whether present context node has already been visited during the conversation. Further, the context detection module 217 may store the information related to the primary context and each of the one or more secondary contexts in the KCI 111, thereby updating the KCI 111 every time a new context is determined.

In an embodiment, the response generation module 221 may be responsible for generating the one or more adaptive responses 117 to the user interactions 103. The one or more adaptive responses 117 are generated based on the one or more intents 107 and one or more named entities 109 associated with the one or more intents 107 and the updated KCI 111. In an embodiment, the response generation module 221 may generate the one or more adaptive responses 117 only when the 'non-enquiry' intent is determined in the user interactions 103. Further, the response generation module 221 may be configured with a context-switching method (illustrated in FIG. 4A description), which enables the response generation module 221 to determine a change in the context of the user interactions 103. Upon determining the change in the context of the user interactions 103, the response generation module 221 generates one or more adaptive responses 117 that correspond to each context of the user interactions 103.

The following exemplary conversation between the user 101 and the response generation system 105 illustrates how the response generation system 105 determines change in the context of the user interactions 103 and then generates the context-based adaptive responses 117 using the updated KCI 111.

Response Generation System (RGS): Hello! How may I help you today?
User: Hello! Advise me regarding retirement savings planning—[Context 1]
RGS: We need few information from you to suggest the correct plan to you. May I know your current age? (in years) [Response to user query]
User: How is your service different from other services? [Context-2—Enquiry intent]
RGS: Our investment match service provides regulated personal investment advice. advising you how much you can invest, at what risk level, and in which fund. Our advice is backed by 'XYZ Bank' and regulated by the 'ABC regulations'. Many other digital investment services only provide investment guidance as opposed to personal investment advice, meaning that you must make your own decision as to how much to invest, at what risk level, and in which fund. [Response to subsequent user query]
User: Okay, got it. [Affirmative intent]

RGS: What is your current age? (in years) [Response for Context-1]

In the above user interactions 103, the user 101 requests the response generation system 105 to advise regarding the retirement savings plans. The response generation system 105 parses the user query and extracts the intents 107 and named entities 109 from the user query, using the intent extraction module 215. Here, the intent is 'seeking advice' (an Enquiry) and the named entity is 'Retirement savings plans'. Further, the context detection module 217 in the response generation system 105 determines the context of the user query based on the extracted intent 107 and its associated named entity 109. Since, the present user query is a discussion starter query and no other contexts are determined before the present context, the response generation system 105 treats the present context to be a primary context (Context-1) of the user interactions 103.

Further, the response generation module 221 generates a response corresponding to the user query in the primary context. In the above example, the response generation module 221 has generated a subsequent query to the user 101, requesting the user 101 to provide his current age to advise most relevant retirement savings plans to the user 101. Going forward, the user 101, instead of responding to the subsequent query from the response generation system 105, may raise a subsequent user query asking the response generation system 105 to explain how the service provided by the response generation system 105 is different from other service. Here, once again the response generation system 105 parses the subsequent user query and extracts the intent 107 and the named entity 109 of the subsequent user query. In the above example, the intent of subsequent user query is 'seeking explanation' (an Enquiry intent) and the named entity 109 is 'services'. Since the intent of the subsequent user query is an 'Enquiry' intent, the response generation system 105 identifies that there is a change in the context of the user interactions 103 and determines the present context to be a secondary context (context-2) of the user interactions 103. Further, the response generation system 105 generates and provides a subsequent adaptive response for the secondary context of the user interactions 103.

In an embodiment, upon receiving the subsequent adaptive response for the secondary context, the user 101 may respond with a positive intent (an Affirmative intent) such as, 'Okay, got it', if the user 101 is satisfied with the subsequent adaptive response provided by the response generation system 105. Here, upon determining the Affirmative intent (i.e., a 'Non-enquiry' intent) in the user response for the secondary context, the response generation system 105 may switch back to the primary context of the user interactions 103. Further, based on the conversation information stored in the KCI 111, the response generation system 105 may identify a previously provided response and/or subsequent query and provides it to the user 101. In the above example, the response generation system 105 identifies that the user 101 has not answered the previously provided query, i.e. requesting the user 101 to provide his current age, and hence provides the same query to the user 101.

Alternatively, if the user 101 is not satisfied with the subsequent adaptive response provided by the response generation system 105, then the user 101 may request the response generations system 101 to further clarify the response. Here, the response generation system 101 understands that, the request made by the user 101 has an 'Enquiry' intent, and hence the response generation system 105 modifies the previously provided response in a way that the user 101 can understand the response. In the above example, the response generation system 105 may rephrase the response and/or add additional information to the already provided response to make the user 101 understand why the investment match service is better than other services. The above sequence of actions may be continued until the user responds with a 'Non-enquiry' intent. Upon detecting the 'Non-enquiry' intent, the response generation system 105 may conclude present secondary context of the user interactions 103 and switch to other secondary contexts or to the primary context of the user interactions 103 based on the updated KCI 111. Thus, the response generation system 105 is capable of tracking changes in the contexts of the user interactions 103, and thereby provides adaptive responses 117 corresponding to each context of the user interactions 103.

In an embodiment, the KCI 111 may be dynamically updated during each user interactions 103 between the user 101 and the response generation system 105. Following paragraph provides an exemplary illustration of how the information in the KCI 111 is appended and updated with respect to the above example.

//KCI for the primary context-Context 1

```
{
    "current_dialog_node": "root",
    "last_node_history": [ "root", "Ask age if understanding is
    correct"],
        "last_response_history": ["Hello! How may I help you today?",
        "We need few information from you to suggest the correct plan to
you. What is your current age? (in years)"],
        "last_topic": null,
        "main_context_history": [ "root", "Seeking advice", "root"],
        "on_enquiry": true,
        "previous_dialog_node": "root",
        "previous_response": "Our investment match service provides
regulated personal investment advice, advising you how much you can
invest, at what risk level, and in which fund. Our advice is backed by
'XYZ Bank' and regulated by the 'ABC regulations'. Many other
digital investment services only provide investment guidance as opposed
to personal investment advice, meaning that you must make your own
decision as to how much to invest, at what risk level, and in which fund."
}
```

//KCI for the secondary context-Context 2

```
{
    "context": {"conversation_id":"645f4198-0a3-a240
    46a69a21ceac",
    "emotion": {
    "anger": 0.204802,
    "disgust": 0.09966,
    "fear": 0.007726,
        "joy": 0.373823,
        "sadness": 0.202245
        },
"history": {"current_dialog_node": "root",
    "last_node_history": [ "root", "Ask age if understanding is
correct"], "last_response_history": [ "Hello! How may I help you
today?", "We need few information from you to suggest the correct plan
to you. What is your current age? (in years)"],
        "last_topic": null,
        "main_context_history": ["root", "Seeking advice", "root"],
        "on_enquiry": true,
        "previous_dialog_node": "root",
        "previous_response": "Our investment match service provides
regulated personal investment advice, advising you how much
you can invest, at what risk level, and in which fund. Our
advice is backed by MyBank and regulated by the FCA. Many
other digital investment services only provide investment
guidance as opposed to personal investment advice, meaning
that you must make your own decision as to how much to
```

-continued

```
        invest, at what risk level, and in which fund."
    },
        "human_required": false,
        "loop_count": 0,
        "branch_exited": true,
        "branch_exited_reason": "completed",
        "dialog_request_counter": 4,
        "dialog_stack": [{"dialog_node": "root"}],
        "dialog_turn_counter": 4
        "Named_entities": [{"confidence": 1, "funds", "location": 3],
        "value": "how"}],
        "input": {"text": "how is your service different from others"},
        "intents": [{"confidence": 0.9997980281, "intent":
        "enquiry_0001"}],
            "output": {
            "log_messages": [ ],
            "nodes_visited": ["node_1_1487319669283", "Enquiry"],
            "text": [ "Our investment match service provides regulated
        personal investment advice, advising you how much you
        can invest, at what risk level, and in which fund. Our advice is
        backed by 'XYZ Bank' and regulated by the 'ABC
        regulations'. Many other digital investment services only provide
        investment guidance as opposed to personal investment advice,
        meaning that you must make your own decision as to how much
        to invest, at what risk level, and in which fund."]}
}
```

Figure 3A:
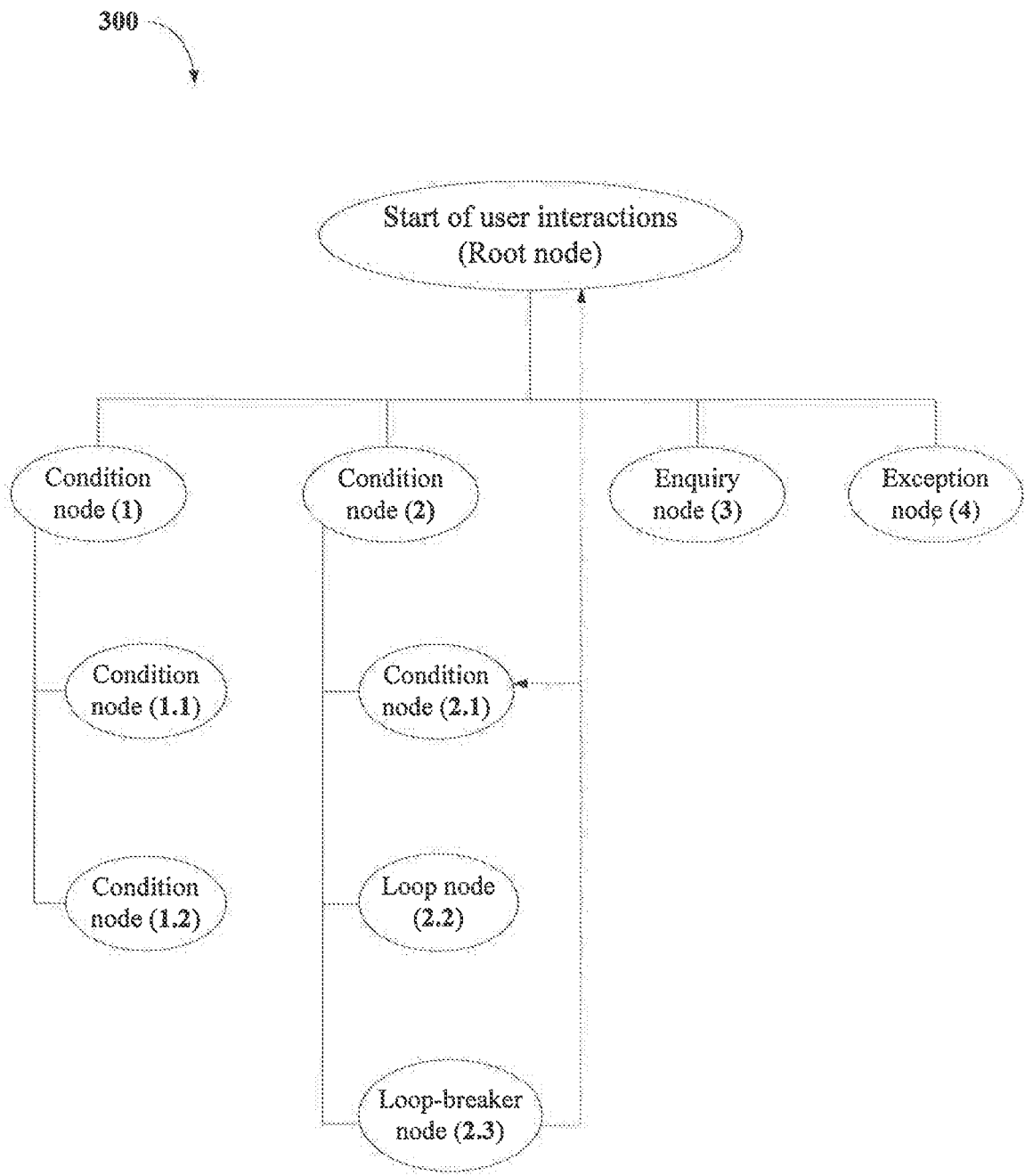
FIG. 3A illustrates an exemplary structure of a conversation tree in accordance with some embodiments of the present disclosure.

FIG. 3A illustrates an exemplary structure of a conversation tree in accordance with some embodiments of the present disclosure.

In an embodiment, the conversation tree is the conversation and/or the user interactions 103 between the user 101 and the response generation system 105 that is represented using tree data structure, in which each node of the conversation tree is associated with predetermined condition and response. The condition associated with the node is a predetermined logic that must be checked to decide whether current instance of the conversation belongs to the present node. The response associated with the node is a string vector that must be provided to the user 101 as a response when the corresponding condition is matched or satisfied.

The conversation tree may be used for providing the context-based adaptive responses 117 to the user interactions 103. The beginning of conversation and/or the user interactions 103 is represented by a discussion starter node, called the root node or the primary node of the conversation tree. As the conversation progresses, the response generation system 105 traverses from the root node (representing the primary context) to the child nodes (representing one or more condition nodes such as, Loop nodes, Loop breaker nodes, Enquiry nodes, and Exception nodes) in an ordered manner. The conditions associated with nodes are checked based on user input, and if a match is found, then the response corresponding to the matched condition is provided to the user 101. Significance of each type of the condition nodes, namely, the Loop condition node, the Loop-breaker condition node, the Enquiry node, and the Exception node may be as following:

a. Loop Condition Node: The Loop condition node is an optional node in the conversation tree. The Loop condition node may be used to request the user 101 to rephrase the user query in a way that the response generation system 105 can understand.

b. Loop-Breaker Condition Node: The Loop-breaker condition node is a sibling of the previous Loop condition node. The Loop-breaker condition node may include the conditions which may allow the response generation system 105 to escape the Loop condition node and to go back to the root node.

c. Enquiry Node: The Enquiry node is the default node for all the enquiry intents detected in the user interactions 103. The Enquiry node may be a direct child of the root node. Whenever an enquiry is triggered in the user interactions 103, the Enquiry node is visited first.

d. Exception Node: The Exception node may be visited whenever other nodes fail to match the user query. i.e., the Exception node may be reached when the response generation system 105 is unable to generate and provide an adaptive response to the user query. The Exception node may be a direct child of the root node. In some embodiments, upon reaching the Exception node, the response generation system 105 may perform predetermined exception handling operations including, without limiting to, searching one or more external databases for the relevant responses, consulting a domain expert or a support personnel associated with the response generation system 105 for providing the one or more adaptive responses 117 to the user interactions 103.

In an embodiment, the information related to each of the one or more nodes in the conversation tree are stored in the KCI 111 and this information are referred by the response generation system 105 to verify whether there has been a change in the context of the user interactions 103.

Figure 3B:
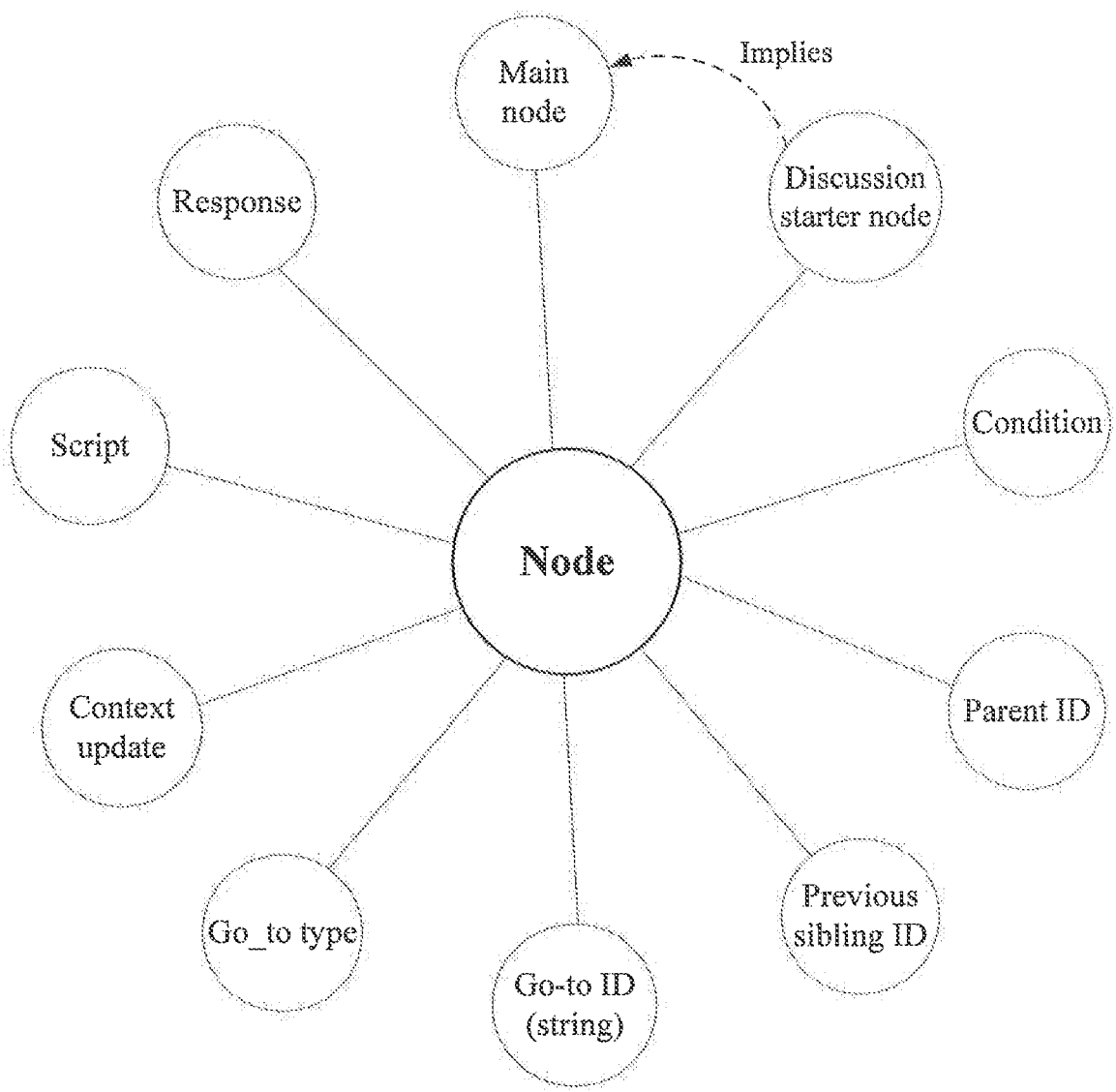
FIG. 3B shows a pictorial representation of structure of a conversation node in accordance with some embodiments of the present disclosure.

FIG. 3B shows a pictorial representation of structure of each node in the conversation tree illustrated in FIG. 3A.

In an embodiment, the conversation tree may be stored as a JSON object. Therefore, each node in the conversation tree may be stored as JSON objects. The node, as a JSON object, may consist following fields:

a. Condition (Formula)

The condition field associated with the node includes a predetermined logic that must be checked to decide whether current instance of the conversation belongs to the present node.

b. Response (String)

The response field associated with the node includes a string vector that must be provided to the user 101 as a response when the corresponding condition is matched or satisfied.

c. Main Node (Boolean)

The 'Main node' field is a Boolean indicator, which indicates whether to remember visits to the present node.

d. Discussion Starter Node (Boolean)

The 'Discussion starter node?' field is a Boolean indicator, which indicates whether the present node is the starting point of a significant discussion. A Discussion starter node may be always a Main node in the conversation tree.

e. Parent ID (String)

The Parent ID field indicates node ID of the parent node of the present node.

f. Previous Sibling ID (String)

The 'Previous sibling ID' field indicates the node ID of sibling node of the present node.

g. Go_to ID (string)

The 'Go_to' ID field indicates the node ID of a 'Go_to' node, which are supposed to be visited right after the current node.

h. Go_to Type (String)

The 'Go_to type' field indicates the type of 'Go_to' actions that must be performed.

The type of 'Go_to' actions may be at least one of:
Condition action: Go to the node and check the condition.

Body action: Go to the node and directly display the response.

User input action: Go to the node and wait for the user input. Then, continue to check other conditions of the node.

i. Context Update (Formula)

The 'Context update' field indicates the response generation system 105 to store a specific information derived from the user input in the KCI 111.

j. Script (Formula)

The 'Script' field includes a piece of code that must be executed if the present node is visited during the user interactions 103.

Figure 4A:
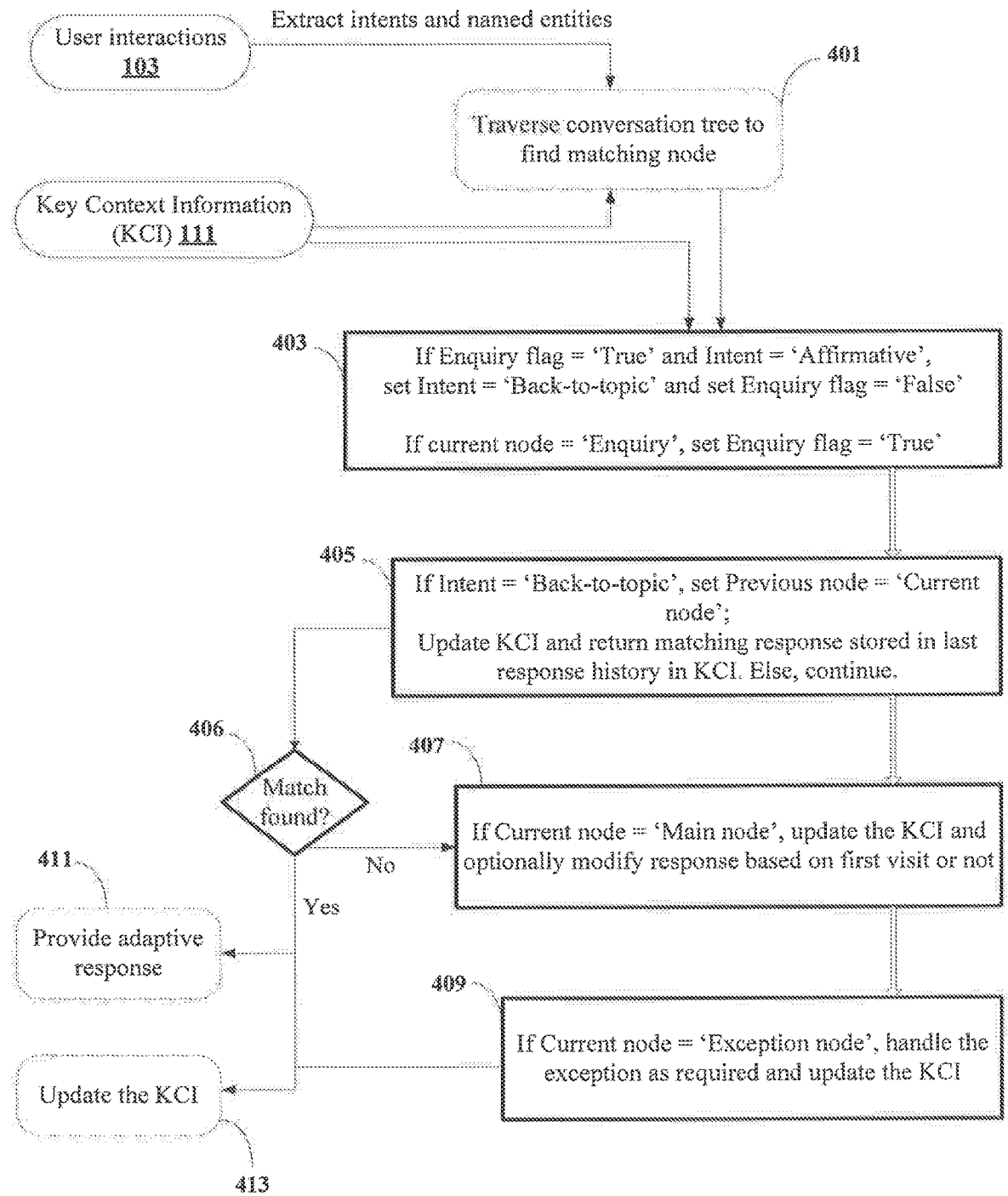
FIG. 4A illustrates a flowchart for determining context switching in a conversation in accordance with some embodiments of the present disclosure.

FIG. 4A illustrates a flowchart for determining context switching in a conversation in accordance with some embodiments of the present disclosure.

The aspect of the instant method is its ability to detect a change in the context of the user interactions 103 and to dynamically generate and provide the context-based adaptive responses 117 to the user 101 by switching the context of the user interactions 103. The above aspect is achieved with the help of a context-switching method configured in the response generation system 105.

In an embodiment, referring to the flowchart in FIG. 4A, upon extracting the one or more intents 107 and one or more named entities 109 associated with the one or more intents 107 from the user interactions 103, at step 401, the response generation system 105 begins traversal of the conversation tree to identify a node, whose condition matches with the extracted one or more intents 107 and one or more named entities 109 associated with the one or more intents 107, based on the updated KCI 111. Upon identifying the matching node in the conversation tree, the response generation system 105 identifies a matching response to the user query based on the context-switching method. The context-switching method (based on waterfall approach) may be explained in the following sequence of steps:

1. At step 403, the response generation system 105 checks if the Enquiry flag is 'True' and the intent is 'Affirmative'. Suppose, if the Enquiry flag 'True', then the intent is set as 'Back_to_the_topic' and the Enquiry flag is set as 'False'.
2. At step 405, the response generation system 105 checks if the intent is 'Back_to_the_topic' and sets the Last topic node as Current node if the intent is 'Back_to_the_topic'. Then, the corresponding response stored in the last response history is returned. Further, at condition 406, the response generation system 105 checks if the response returned from step 405 matches and/or satisfies the condition of the matching node. If the response satisfies the condition of the node, then, at step 411, the same response is provided to the user 101 as the adaptive response to the user query. Subsequently, the KCI 111 is updated at step 413 upon providing the response to the user 101. Alternatively, if the response does not satisfy the condition of the node, then the response generation system 105 performs actions defined in step 407.
3. At step 407, the response generation system 105 updates the KCI 111 based on whether the current node is a main node or not. Optionally, the response generation system 105 may modify the response returned from step 405 and verifies if the modified response has matched with the condition of the node. Further, the response generation system 105 verifies whether the last visited node is an Enquiry node. Suppose, if the last visited node is the Enquiry node, then the Enquiry flag is set as 'True'.
4. At step 409, the response generation system 105 checks if the current node is an Exception node. Suppose, if the current node is an Exception node, then the response generation system 105 may perform the predetermined exception handling operations to handle the exceptions. Finally, the response generation system 105 updates the KCI 111 at step 413.

In an embodiment, the response generation system 105 may iteratively perform the above sequence of operations until a matching response is identified and the condition of the node is satisfied. Once the condition of the node is satisfied, the response generation system 105 provides the identified matching response as the adaptive response to the user 101.

Figure 4B:
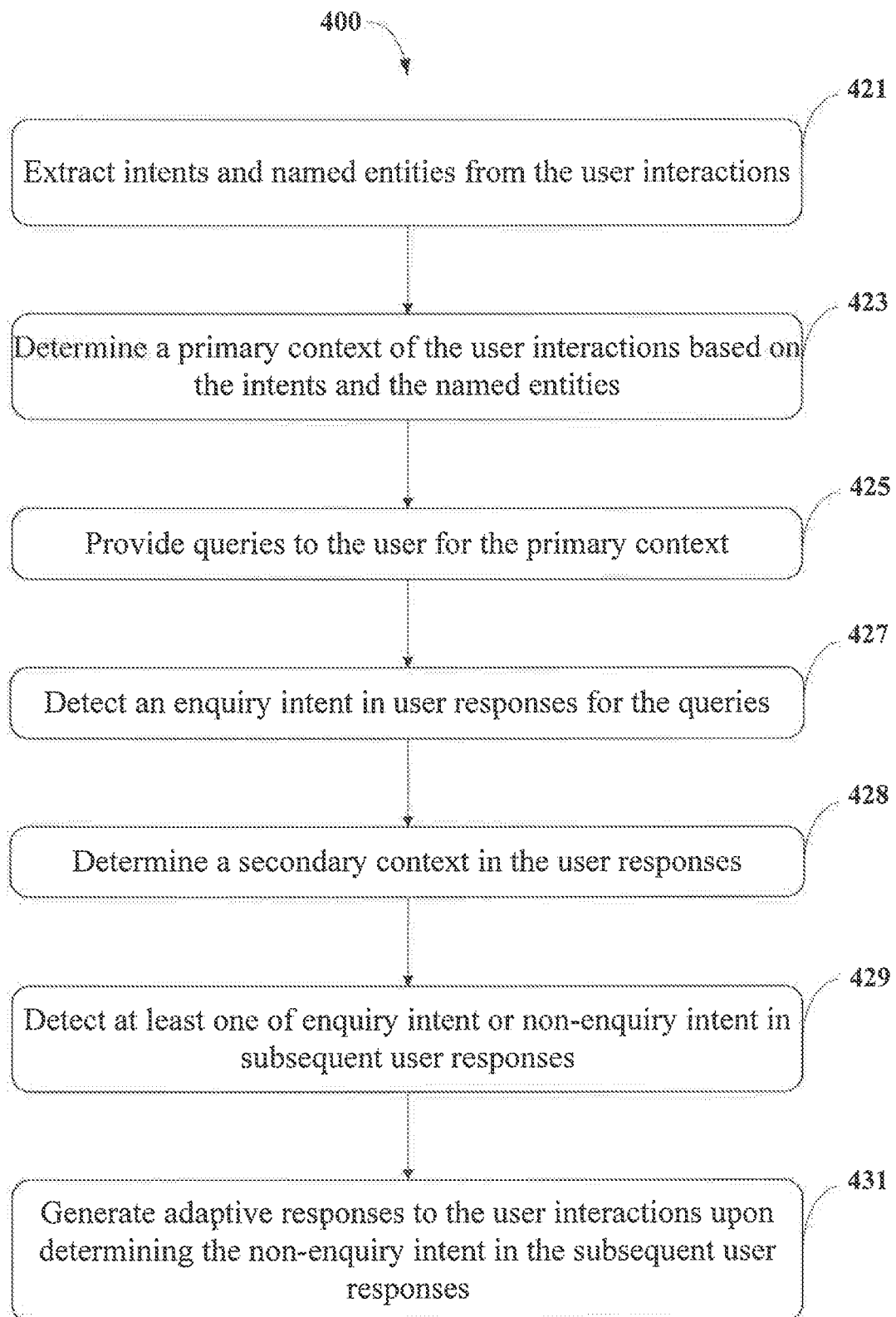
FIG. 4B shows a flowchart illustrating a method of providing context based adaptive response to user interactions in accordance with some embodiments of the present disclosure.

FIG. 4B shows a flowchart illustrating a method for providing context based adaptive responses 117 to user interactions 103 in accordance with some embodiments of the present disclosure.

As illustrated in FIG. 4B, the method 400 includes one or more blocks illustrating a method for providing the context based adaptive responses 117 to the user interactions 103 using a response generation system 105, for example the response generation system 105 of FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 421, the method 400 comprises extracting, by the response generation system 105, one or more intents 107 and one or more named entities 109 associated with the one or more intents 107 from the user interactions 103. The one or more intents 107 may represent an intent of the user 101 in the one or more user queries, which must be understood by the response generation system 105 for providing the context based automated response to the one or more user queries. As an example, the one or more intents 107 may be one of a 'Quit' intent, a 'Back_to_the_topic' intent, an 'Enquiry' intent, an 'Confirm' intent and a 'Deny' intent. Similarly, the one or more named entities 109 associated with the one or more intents 107 may represent a list of attributes such as numeric values, time frames, name of locations and the like that are included in the one or more user queries.

At block 423, the method 400 comprises determining, by the response generation system 105, a primary context of the user interactions 103 based on the one or more intents 107 and the one or more named entities 109. In some embodiments, the information related to the primary context may be recorded as Key Context Information (KCI) 111. As an example, the KCI 111 may include, without limiting to, information related to the primary context of the user interactions 103, the secondary context of the user interactions 103, the subsequent secondary contexts of the user interactions 103, the one or more subsequent responses provided to the user 101, a status flag indicating presence of one of the enquiry intent or the non-enquiry intent in the user interactions 103, and information related to the secondary context previously handled by the response generation system 105.

At block 425, the method 400 comprises providing, by the response generation system 105, one or more queries to the user 101. In some embodiments, the one or more queries provided to the user 101 may be related to the primary context of the user 101.

At block 427, the method 400 comprises detecting, by the response generation system 105, an enquiry intent in one or more user responses received in response to the one or more queries provided to the user 101. Further, at block 428, the response generation system 105 determines a secondary context in the one or more user responses upon detecting the enquiry intent in the one or more user responses. In some embodiments, information related to the secondary context of the user interactions 103 may be stored and/or updated in the KCI 111.

At block 429, the method 400 comprises detecting, by the response generation system 105, at least one of the enquiry intent or a non-enquiry intent in one or more subsequent user responses received in response to one or more subsequent responses provided to the user 101. The one or more subsequent responses may be generated and provided to the user 101 in response to one or more queries related to the secondary context of the user interactions 103.

At block 431, the method 400 comprises generating, by the response generation system 105, one or more adaptive responses 117 to the user interactions 103 based on the updated KCI 111 upon determining the non-enquiry intent in the one or more subsequent user responses. In some embodiments, the response generation system 105 may directly provide the one or more adaptive responses 117 for the primary context of the user interactions 103 when the non-enquiry intent is detected in the one or more user responses receiving in response to the one or more queries for the primary context.

In some embodiments, generating the one or more adaptive responses 117 further includes switching the context of the user interactions 103 from the secondary context to the primary context based on the updated KCI 111 upon determining the non-enquiry intent in the one or more subsequent user responses. Further, the one or more user responses may be received in response to the one or more queries provided to the user 101 upon switching the context to the primary context. Finally, the one or more adaptive responses 117 may be generated to the one or more user responses upon determining the non-enquiry intent in the one or more user responses.

In some embodiments, there may be more than one secondary context in the user interactions 103. Hence, the method of generating the one or more adaptive responses 117 further includes determining a subsequent secondary context in the one or more subsequent user responses upon detecting the enquiry intent in the one or more subsequent user responses. Further, one or more secondary user responses are received in response to one or more queries generated for the subsequent secondary context. Finally, the one or more adaptive responses 117 are generated for the detected subsequent secondary context. In some embodiments, the response generation system 105 may repeatedly determine the subsequent secondary contexts in the user interactions 103 until the non-enquiry intent is detected in the one or more secondary user responses received by the user 101.

In some embodiments, the response generation system 105 may perform an exception operation when the response generation system 105 is unable to generate the one or more adaptive responses 117 to the user interactions 103. As an example, the exception operation may include at least one of searching one or more external databases, consulting a domain expert or a support personnel associated with the response generation system 105 for providing the one or more adaptive responses 117 to the user interactions 103.

Computer System

Figure 5:
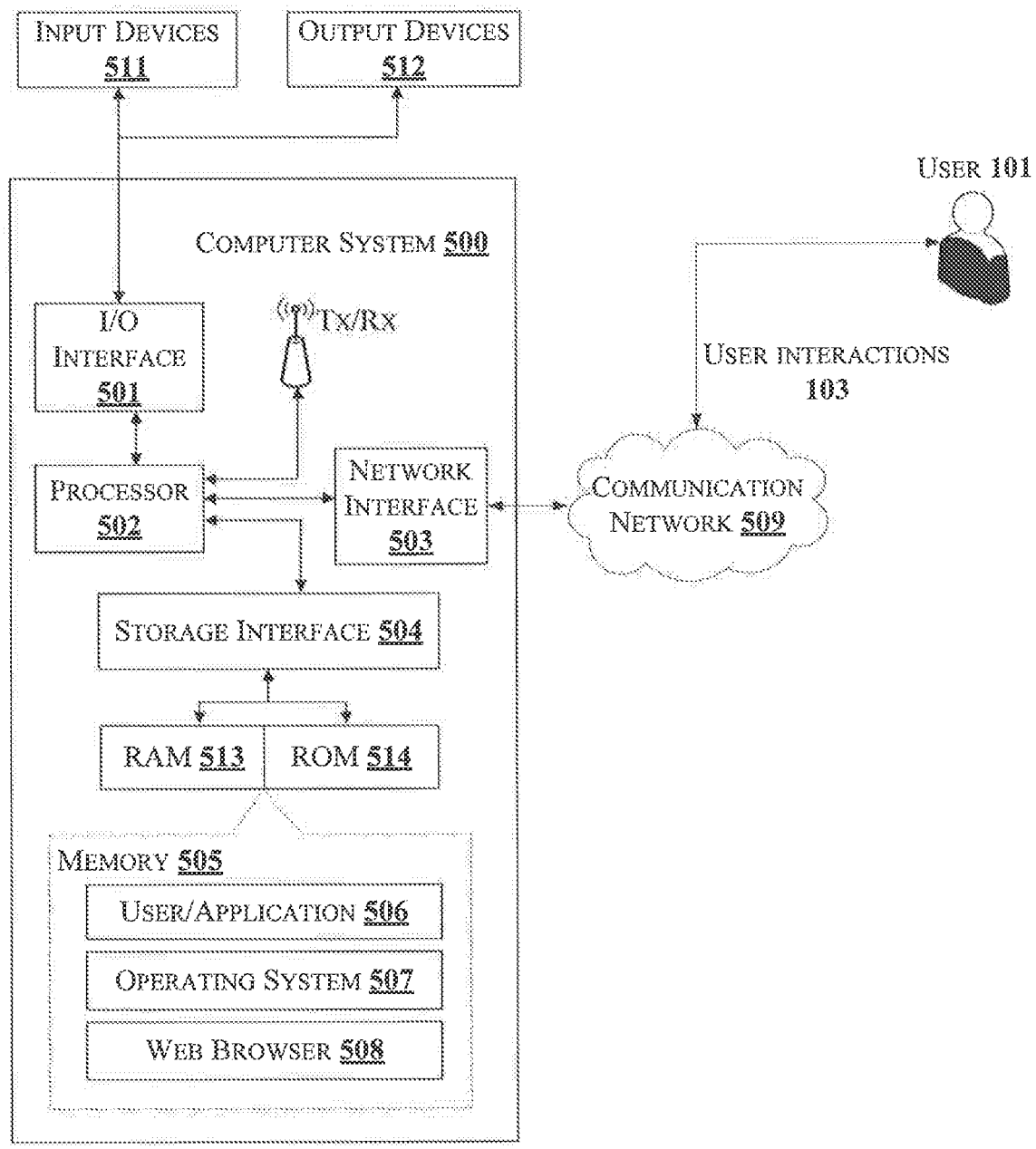
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be response generation system 105 which is used for providing context based adaptive response to user interactions 103. The computer system 500 may include a central processing unit ("CPU" or "processor") 502. The processor 502 may comprise at least one data processor for executing program components for executing user- or system-generated business processes. A user may include a person, a person using a device in the computing environment 100, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512. In some implementations, the I/O interface 501 may be used to connect to a user device, such as a smartphone associated with the user, through which the user interacts with the response generation system 105.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with the user 101 to perform user interactions 103 with the user 101.

The communication network 509 can be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a method for providing context based adaptive response to user interactions.

In an embodiment, the method of present disclosure is capable of automatically detecting a change in the context and/or topic of the conversation during the user interactions.

In an embodiment, the response generation system of present disclosure maintains a track of flow of the conversation to detect deviation in the context of the conversation, thereby providing adaptive responses corresponding to the changes in the context of the conversation.

In an embodiment, the method of present disclosure performs natural conversation with the user and improves overall user experience by providing context based adaptive responses to the user.

In an embodiment, the method of present disclosure enhances query processing efficiency and/or speed of the chatbots or automated response generation systems, thereby improving the overall efficiency of the chatbots.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The enumerated listing of items does not imply that any or all the items are mutually exclusive, unless expressly specified otherwise. The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | User |
| 103 | User interactions |
| 105 | Response generation system |
| 106 | Training system |
| 107 | Intent of conversation |
| 109 | Named entities |
| 111 | Key Context Information (KCI) |
| 117 | Adaptive responses |
| 201 | I/O interface |
| 203 | Processor |
| 205 | Memory |
| 207 | Data |
| 209 | Modules |
| 213 | Other data |
| 215 | Intent extraction module |
| 217 | Context detection module |
| 221 | Response generation module |
| 223 | Other modules |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application |
| 507 | Operating system |
| 508 | Web browser |
| 509 | Communication network |
| 511 | Input devices |
| 512 | Output devices |
| 513 | RAM |
| 514 | ROM |

What is claimed is:

1. A method for providing context based adaptive response to user interactions, the method comprising:

extracting, by a response generation system, one or more intents and one or more named entities associated with the one or more intents from the user interactions;

determining, by the response generation system, a primary context of the user interactions based on the one or more intents and the one or more named entities, wherein information related to the primary context is recorded as Key Context Information (KCI);

providing, by the response generation system, one or more queries to the user for the primary context;

detecting, by the response generation system, an enquiry intent in one or more user responses for the one or more queries;

determining one or more secondary contexts in the one or more user responses upon detecting the enquiry intent, wherein information related to the one or more secondary contexts is updated in the KCI;

detecting, by the response generation system, at least one of the enquiry intent or non-enquiry intent in one or more subsequent user responses received in response to one or more subsequent responses provided to the user, wherein the one or more subsequent responses are generated in response to one or more queries for the one or more secondary contexts;

generating, by the response generation system, one or more adaptive responses, based on the updated KCI, to the user interactions, upon determining the non-enquiry intent in the one or more subsequent user responses, wherein generating the one or more adaptive responses comprises switching from the one or more secondary contexts to one or more other secondary contexts or the primary context; and generating one or more adaptive responses, based on the updated KCI, to the user interactions, upon performing an exception operation when the response generation system is unable to generate the one or more adaptive responses.

2. The method as claimed in claim 1, wherein generating the one or more adaptive responses further comprises:

receiving, by the response generation system, the one or more user responses for the one or more queries provided to the user upon switching to the primary context; and generating, by the response generation system, one or more adaptive responses to the one or more user responses upon determining the non-enquiry intent in the one or more user responses.

3. The method as claimed in claim 1 further comprising performing, by the response generation system, steps of:

determining a subsequent secondary context in the one or more subsequent user responses upon detecting the enquiry intent in the one or more subsequent user responses;

receiving one or more secondary user responses in response to one or more queries generated for the subsequent secondary context; and generating the one or more adaptive responses for the detected subsequent secondary context.

4. The method as claimed in claim 3, wherein the one or more adaptive responses for the subsequent secondary context is iteratively generated until the non-enquiry intent is detected in the one or more secondary user responses.

5. The method as claimed in claim 1, wherein the one or more adaptive responses for the primary context of the user interactions are directly provided to the user when the non-enquiry intent is detected in the one or more user responses.

6. The method as claimed in claim 1, wherein the exception operation comprises at least one of searching one or more external databases, consulting a domain expert, or a support personnel associated with the response generation system for providing the one or more adaptive responses to the user interactions.

7. The method as claimed in claim 1, wherein the KCI comprises at least one of information related to the primary context of the user interactions, the one or more secondary contexts of the user interactions, the subsequent secondary contexts of the user interactions, the one or more subsequent responses provided to the user, a status flag indicating presence of one of the enquiry intent or the non-enquiry intent in the user interactions, and information related to the one or more secondary contexts previously handled by the response generation system.

8. A response generation system for providing context based adaptive response to user interactions, the response generation system comprising:

a processor; and a memory, communicatively coupled to the processor, wherein the memory stores processor-executable instructions, which on execution, cause the processor to:

extract one or more intents and one or more named entities associated with the one or more intents from the user interactions;

determine a primary context of the user interactions based on the one or more intents and the one or more named entities, wherein information related to the primary context is recorded as Key Context Information (KCI);
provide one or more queries to the user for the primary context;
detect an enquiry intent in one or more user responses for the one or more queries;
determine one or more secondary contexts in the one or more user responses upon detecting the enquiry intent, wherein information related to the one or more secondary contexts is updated in the KCI;
detect at least one of the enquiry intent or non-enquiry intent in one or more subsequent user responses received in response to one or more subsequent responses provided to the user, wherein the one or more subsequent responses are generated in response to one or more queries for the one or more secondary contexts;
generate one or more adaptive responses, based on the updated KCI, to the user interactions, upon determining the non-enquiry intent in the one or more subsequent user responses, wherein generating the one or more adaptive responses comprises switching from the one or more secondary contexts to one or more other secondary contexts or the primary context; and
generating one or more adaptive responses, based on the updated KCI, to the user interactions, upon performing an exception operation when the response generation system is unable to generate the one or more adaptive responses.

9. The response generation system as claimed in claim 8, wherein to generate the one or more adaptive responses, the instructions further cause the processor to:
receive the one or more user responses for the one or more queries provided to the user upon switching to the primary context; and
generate one or more adaptive responses to the one or more user responses upon determining the non-enquiry intent in the one or more user responses.

10. The response generation system as claimed in claim 8, wherein the instructions further cause the processor to:
determine a subsequent secondary context in the one or more subsequent user responses upon detecting the enquiry intent in the one or more subsequent user responses;
receive one or more secondary user responses in response to one or more queries generated for the subsequent secondary context; and
generate the one or more adaptive responses for the detected subsequent secondary context.

11. The response generation system as claimed in claim 10, wherein the one or more adaptive responses for the subsequent secondary context is iteratively generated until the non-enquiry intent is detected in the one or more secondary user responses.

12. The response generation system as claimed in claim 8, wherein the processor directly provides the one or more adaptive responses for the primary context of the user interactions to the user when the non-enquiry intent is detected in the one or more user responses.

13. The response generation system as claimed in claim 8, wherein the exception operation comprises at least one of searching one or more external databases, consulting a domain expert, or a support personnel associated with the response generation system to provide the one or more adaptive responses to the user interactions.

14. The response generation system as claimed in claim 8, wherein the KCI comprises at least one of information related to the primary context of the user interactions, the one or more secondary contexts of the user interactions, the subsequent secondary contexts of the user interactions, the one or more subsequent responses provided to the user, a status flag to indicate presence of one of the enquiry intent or the non-enquiry intent in the user interactions, and information related to the one or more secondary contexts previously handled by the processor.

15. A non-transitory computer readable medium including instructions stored thereon that when processed by at least one processor cause a response generation system to perform operations comprising:
extracting one or more intents and one or more named entities associated with the one or more intents from the user interactions;
determining a primary context of the user interactions based on the one or more intents and the one or more named entities, wherein information related to the primary context is recorded as Key Context Information (KCI);
providing one or more queries to the user for the primary context;
detecting an enquiry intent in one or more user responses for the one or more queries;
determining one or more secondary contexts in the one or more user responses upon detecting the enquiry intent, wherein information related to the one or more secondary contexts is updated in the KCI;
detecting at least one of the enquiry intent or non-enquiry intent in one or more subsequent user responses received in response to one or more subsequent responses provided to the user, wherein the one or more subsequent responses are generated in response to one or more queries for the one or more secondary contexts;
generating one or more adaptive responses, based on the updated KCI, to the user interactions upon determining the non-enquiry intent in the one or more subsequent user responses, wherein generating the one or more adaptive responses comprises switching from the one or more secondary contexts to one or more other secondary contexts or the primary context; and
generating one or more adaptive responses, based on the updated KCI, to the user interactions, upon performing an exception operation when the response generation system is unable to generate the one or more adaptive responses.

* * * * *